United States Patent [19]
Richter

[11] Patent Number: 4,570,500
[45] Date of Patent: Feb. 18, 1986

[54] MECHANISM FOR CONTROLLING THE OPERATION OF MACHINES

[76] Inventor: Robert A. Richter, 12262 Harbor Blvd., Garden Grove, Calif. 92640

[21] Appl. No.: 448,892

[22] PCT Filed: Dec. 31, 1979

[86] PCT No.: PCT/US79/01158
§ 371 Date: Dec. 4, 1981
§ 102(e) Date: Dec. 4, 1981

[87] PCT Pub. No.: WO81/01871
PCT Pub. Date: Jul. 9, 1981

[51] Int. Cl.$^4$ .................... F16H 25/14; F16H 53/08
[52] U.S. Cl. .................................. 74/54; 74/55; 74/57; 74/568 R
[58] Field of Search .................... 74/53–57, 74/567, 568 R, 568 M, 838, 839

[56] References Cited

U.S. PATENT DOCUMENTS

| | | | |
|---|---|---|---|
| 236,144 | 1/1881 | Clark | 74/53 |
| 449,572 | 3/1891 | Cameron | 74/572 |
| 1,280,912 | 10/1918 | Waterman | 123/90.6 |
| 3,224,283 | 12/1965 | Pilia et al. | 74/53 |
| 3,628,645 | 12/1971 | McFeaters et al. | 74/57 |
| 3,865,253 | 2/1975 | Healy | 74/57 |

FOREIGN PATENT DOCUMENTS

| | | | |
|---|---|---|---|
| 665634 | 6/1963 | Canada | 74/57 |
| 11355 | 6/1924 | Netherlands | 74/57 |
| 203087 | 9/1923 | United Kingdom | 74/55 |
| 417305 | 11/1934 | United Kingdom | 74/54 |

Primary Examiner—Lawrence J. Staab
Attorney, Agent, or Firm—Albert O. Cota

[57] ABSTRACT

A mechanism for controlling the travel, velocity and stroke distance of a ram as used in punch and draw presses, and riveting machines, and a lever as used in automatic screw machines, feed mechanisms and indexing machines. In each embodiment the ram/lever is rotatably attached to a cam follower. When the mechanism is in the idle mode the cam follower is at rest in the idle area keeping the ram/lever motionless while the cam rotates. When the work mode is selected an escapement guide is actuated, causing the cam follower to transfer from the idle area into a cycloidal work groove intersecting the idle area. The work groove is configured to produce ram/lever motions commensurate with those required for the specific work piece. The mechanism uses fewer parts than are presently required for conventional machines is easier to maintain, more reliable and requires less power to operate.

6 Claims, 27 Drawing Figures

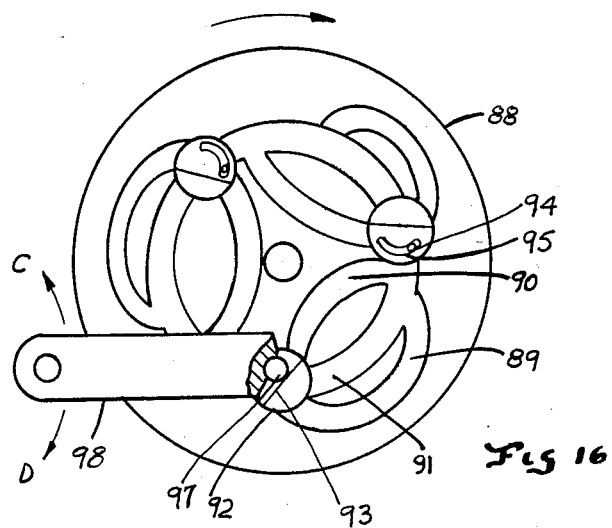
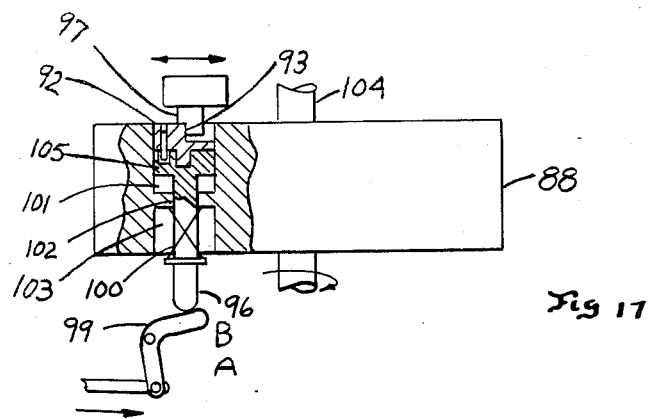

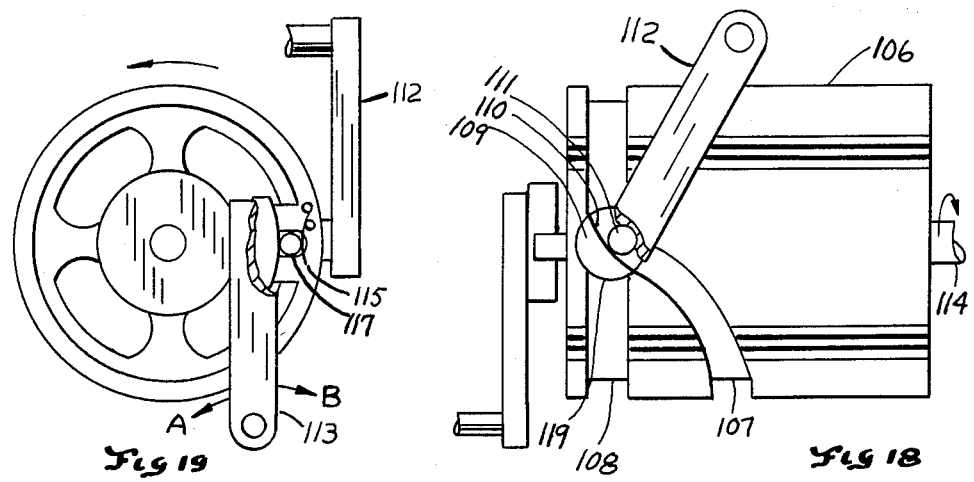
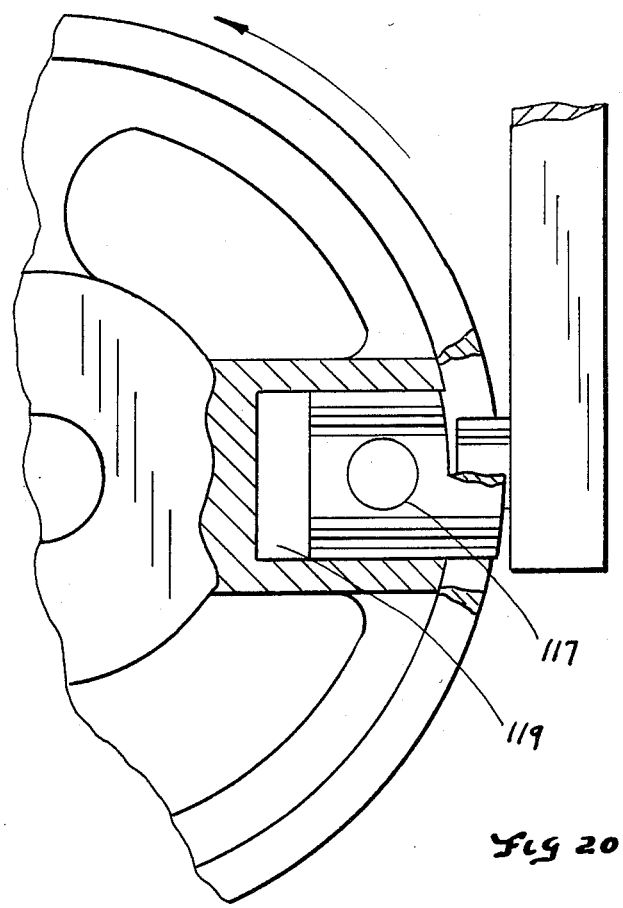
Fig 19
Fig 18
Fig 20

MECHANISM FOR CONTROLLING THE OPERATION OF MACHINES

TECHNICAL FIELD

This invention relates to a cam driven mechanism for variably controlling the pressure, velocity, and stroke displacement of a ram or lever. The ram is particularly used in punch and draw presses, and riveting machines (Group A machines); and the lever as particularly used in automatic screw machines, feed mechanisms and indexing machines (Group B machines).

In subsequent paragraphs the invention is described in connection with the above identified machine groups. However, it should be understood that the invention is applicable to other machines that use a reciprocating work shaft i.e., ram or lever.

BACKGROUND ART

Group A Machines: Conventional punch and draw presses, and riveting machines supply flywheel energy to the dies via an eccentric, pitman arm, ram, clutch, and a brake. The clutch is used to transfer the energy from the flywheel to the ram and the brake is used to stop the motion of the ram at the top of the ram stroke. The ram stroke displacement is fixed by the "throw" of the crankshaft and the rated pressure of the press is available only at the bottom of the ram stroke.

Group B Machines: Automatic screw machines that have multiple spindles employ several cylindrical type cams and have a single clutch located on the main driveshaft. When the clutch is activated all the tool slides converge on the rotating bar stock at the same time yet each tool must be individually adjusted.

Automation equipment as applicable to feed mechanism and indexing machinery is comprised of a clutch, reduction gear and indexer.

Some of the technical problems inherent in Group A machines include the following:

a. The energy supplied by the flywheel to the crankshaft and ecentric can only be extracted at the end of the ram stroke.

b. The ram stroke displacement is fixed and is limited to two times the eccentric of the crankshaft.

c. The pitman arm induces oblique forces into the dies.

d. The flywheel, clutch, brake, pitman arm, ram and other related parts sometimes work against each other during operation.

Some of the technical problems inherent in Group B machines include the following:

a. The toolslides in automatic screw machines are difficult to adjust because all the tool slides converge on the rotating bar stock at the same time.

b. Feed mechanisms and indexing machines have a clutch on the highspeed end of the drive. When the clutch is disengaged the feed or indexing cycle may not stop at the zero point, but rather proceed into the next cycle, which may cause a restart problem.

The background art as applicable to known prior art patents did not disclose any mechanisms or apparatus that read on the claims or are described in the specification of the instant application: Woodson in U.S. Pat. No. 2,429,084 discloses an adjustable cam that relates to automatic control mechanisms for initiating and timing a cycle of operations. This cam is especially adaptable for use on automatic clothes washing machines. Place in U.S. Pat. No. 2,598,427 discloses an apparatus adaptable to draw presses for controlling the blank being drawn and means for adjusting the timing of the control operation of die members without dismantling the machine. Puddingham in U.S. Pat. No. 3,546,993 discloses a locating device for use in effecting the relative location of the work and tools in a machine such as a punch press. Sabotta in U.S. Pat. No. 4,069,724 discloses a cam and follower construction in which a flat plate has a plurality of cam grooves intersecting each other with a cam follower engaging each of the cam grooves. A method is disclosed to insure that each follower stays in its own groove and does not accidentally pass into the wrong groove at the point of intersection.

DISCLOSURE OF THE INVENTION

The invention consists of a cam-driven mechanism for variably controlling the pressure, velocity, and stroke displacement of a ram or lever: the ram as particularly used in punch and draw presses and riveting machines (Group A machines), and the lever as particularly used in automatic screw machines, feed mechanisms and indexing machines (Group B machines). The mechanism is comprised of a cam having an idle area, at least one cycloidal work groove whose two ends intersect the idle area, an escapement guide, and a ram or lever connected to and controlled by a cam follower. The invention as applicable to punch and draw presses can be made in two configurations: in one, the idle area and work groove are an integral part of the flywheel, and in the other the idle area and work groove are comprised of flat plates that can be quickly installed and removed from a conventional flywheel.

When the mechanism is in the idle mode the cam follower remains in the idle area, keeping the ram motionless while the cam rotates. When the work mode is selected the cam escapement is actuated, causing the cam follower to leave the idle area and glide into the work groove. The work groove is uniquely designed to provide the required pressure, velocity, and stroke displacement to the work piece.

The technical problems (a through d) listed in the "Background Art" section for Group A machines are solved by the invention as follows:

a. The invention allows energy to be extracted anywhere along the entire ram stroke.

b. The invention ram stroke is variable and is only limited by the radius of the flywheel.

c. The invention provides straight-line forces into the dies.

d. The invention has fewer parts, a more simple machine, with no clutch, brake or pitman arm.

The technical problems (a and b) listed in the "Background Art" section for Group B machines are solved by the invention as follows:

a. The invention allows disengagement of each toolslide so that each tool can be adjusted individually.

b. The invention has no clutch, therefore the index cycle always completes its stroke.

In addition to solving the above problems the objective of the invention is to also provide a mechanism that: gives greater design latitudes to the die designer by allowing him to select the optimum velocities and pressures for any metal anywhere along the ram stroke. Another objective is to permit one machine to replace several machines by having a cam that is quickly interchangeable. Still another objective is to allow a smooth transfer from the idle mode into the work mode. Thus eliminating the sudden grabbing action of a clutch and the clamping action of a brake to stop the ram. Other objectives are to provide a mechanism that is more reliable, uses fewer parts, requires less power to operate, produces less vibration, and is easier to adjust, operate, and maintain.

BRIEF DESCRIPTION OF DRAWINGS

The details of the invention are described in connection with the accompanying drawings, in which FIGS. 1 through 13 depict Group A machines and FIGS. 14 through 27 depict Group B machines.

FIGS. 1, 2, 3 and 4 represent the preferred embodiment employing a ram and a single work groove.

FIG. 1 is a front view showing the relationship of the idle well, work groove and escapement guide.

FIG. 2 is a side view showing the escapement guide in the retracted idle mode position.

FIG. 3 shows the escapement guide in the extended work mode position.

FIG. 4 is a perspective view of the preferred embodiment.

FIGS. 5, 6, 7 and 8 represent an embodiment employing a ram and two work grooves.

FIG. 5 is a front view showing the relationship of the idle well, the two work grooves and the escapement guide.

FIG. 6 is a side view showing the escapement guide in the fully retracted idle mode position.

FIG. 7 shows the escapement guide in a first extended position (one work groove operational).

FIG. 8 shows the escapement guide in a second fully extended position (both work grooves operational).

FIG. 9 is a front view showing the relationship of the idle well, relative to a plurality of work grooves, and escapement guides.

FIG. 10 is a side view showing one escapement guide in the retracted idle mode position and the other in the extended work mode position.

FIGS. 11, 12 and 13 show the short-stroke embodiment of the invention.

FIG. 11 is a front view depicting the relationship of the cam follower to the escapement guide.

FIG. 12 is a side view showing the mechanism in the idle mode and

FIG. 13 shows the short-stroke in the work mode.

FIG. 14 is a front view showing the relationship of a periphery idle well and a plurality of work grooves and escapement guides.

FIG. 15 is a side view showing one escapement guide in the retracted idle mode and the other extended in the work mode.

FIGS. 16 and 17 show an embodiment having the idle groove midway on the cam with both inward and outward work grooves.

FIG. 16 is a front view showing the single idle groove and a plurality of inward and outward work grooves and escapement guides.

FIG. 17 is a side view showing one of the escapement guides in the work mode.

FIGS. 18, 19 and 20 show the cylindrical cam embodiment of the invention.

FIG. 18 shows the relationship of a idle groove, the work groove, and the escapement guide.

FIG. 19 is an end view showing the relationship of the cam follower, escapement guide, and lever in the idle mode.

FIG. 20 is a closeup end view of FIG. 19 showing the escapement guide and cam follower in the work mode position.

FIG. 21 shows a cylindrical cam with the idle well centrally located and work grooves on one side of the idle well.

FIG. 22 is an end view of the cylindrical cam showing the relationship of the actuating arm, escapement guide, cam follower and work lever.

FIGS. 23, 24, 25, 26 and 27 describe a cylindrical cam centrally located with inward and outward work grooves and the relationship of the escapement guides, cam follower, and work lever.

FIG. 23 is a side view.

FIG. 24 is an end view.

FIGS. 25 and 26 are detailed views showing how the escapement guide rotates and thus guides the cam follower into either an inward or outward work groove from the idle groove.

FIG. 27 is a sectional view showing the details of the escapement guide when in the idle mode position.

DETAILED DESCRIPTION OF THE INVENTION

Figure 1:
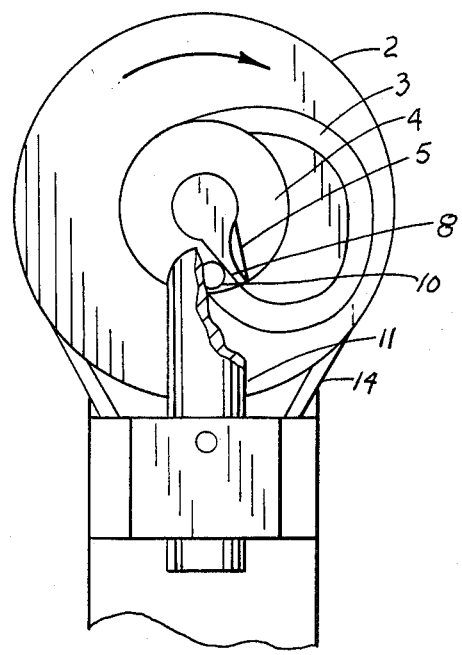

The first and preferred embodiment of the invention is applicable to Group A machines and is depicted in FIGS. 1, 2, 3 and 4. The four views show an embodiment that is comprised of four major elements: a circular flatplate cam 2; an escapement guide 5; a cam follower 10; and a ram 11.

The cam 2 has on its front face a circular recessed idle well 4 with an escapement bore 6 centrally located within the idle well 4 and extending through the cam 2. The cam 2 also has on its front face a recessed cycloidal work groove 3 that intersects the idle well 4 at angles selected to allow the cam follower 10 to glide smoothly from the idle well 4 into the work groove 3 and back again into the idle well 4. The cam 2 in this embodiment also functions as a flywheel. The escapement guide 5 consists of a plate section 7 having a glide surface 8 on the side adjacent to the entry intersection of the work groove 3, and a push-rod section 9 that perpendicularly extends from the backside of the plate section 7. The push rod 9 projects through the escapement bore 6 which is a part of the flywheel support shaft 16.

Figure 3:
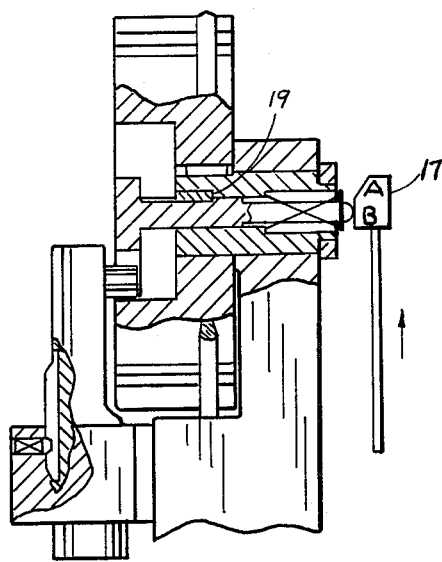
Figure 4:
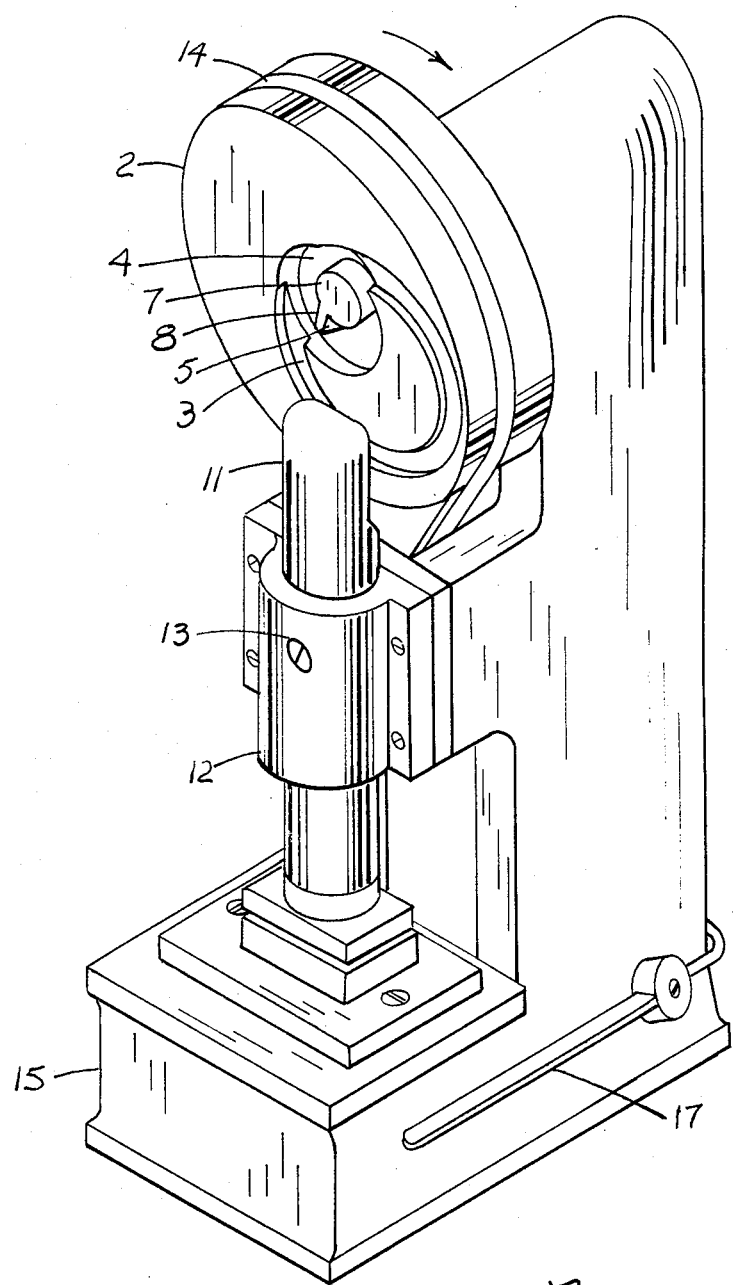
Figure 5:
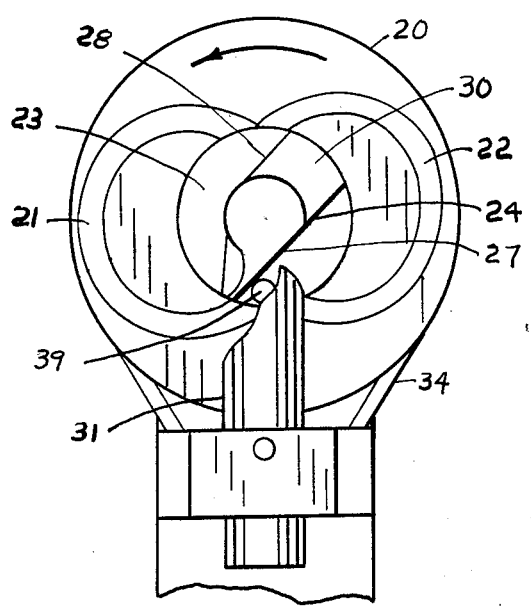

The escapement guide 5 is located and slidably fits in the idle well 4 and in its neutral position is retracted to the bottom of the idle well 4 held there by the spring assembly 18. When the escapement guide 5 is in neutral the cam follower 10 clears the glide surface 8 of the escapement guide 5 and remains positioned in the idle well 4. The escapement guide 5 is axially moveable and radially fixed with the radial fixing accomplished by conventional means such as by the use of a woodruff key 19 as shown in FIG. 3. The cam follower 10 is attached to one end of the ram 11. The ram 11 is a bar that transfers the energy from the cam follower 10 to the work area and is held in the up neutral position by the ram detent assembly 13 located in the ram guide 12.

The operation of the preferred embodiment can best be understood by describing a typical operational cycle which consists of an idle mode and a work mode. In both modes the cam 2 is rotated by a conventional motor (not shown) and a V-belt 14 combination.

Figure 2:
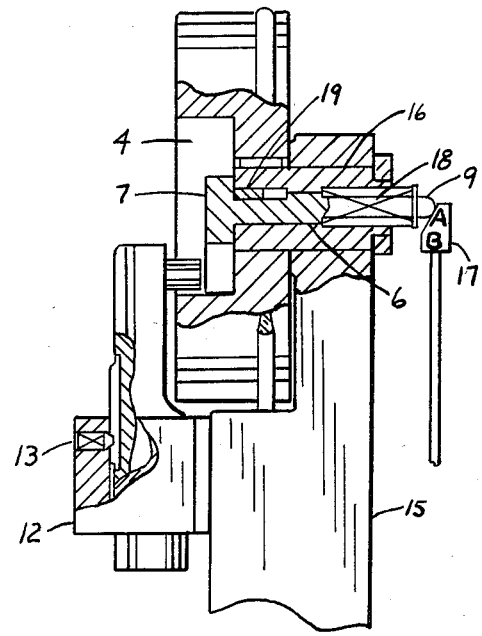

In the idle mode the actuator 17 is in its neutral "A" position, as shown in FIG. 2, applying no force to the push rod 9 of the escapement guide 5. Thus the escapement guide 5 remains in its neutral position resting at the bottom of the idle well 4 and held there by the spring assembly 18. The cam follower 10 is held motionless in its neutral position in the idle well 4, clearing the glide surface 8 as the cam 2 rotates, and the ram is held in its up neutral position by the ram detent assembly 13.

The work mode is set in motion by repositioning the actuator 17 to position "B" as shown in FIG. 3. The actuator 17 forces the push rod 9 to axially displace the escapement guide 5 into its extended position causing the cam follower 10 to strike the glide surface 8 of the escapement guide 5. The cam follower 10 then slidably transfers from the idle well 4 into the entry end of the work groove 3 and dislodges the ram 11 from its up position. As the cam 2 continues to rotate the cam follower 10 and the ram 11 follow the contour of the work groove 3 and the cam follower 10 eventually exists at the other end of the work groove 3 back into the idle well 4. If more than one work cycle is desired the actuator 17 is allowed to remain in position "B" which keeps the escapement guide 5 in its extended position whereupon each revoltion of the cam 2 the cam follower 10 continues to strike the glide surface 8 and slidably transfer into the work groove 3. When it is desired to stop the work mode the actuator 17 is returned to position "A" whereupon the spring assembly 18 applies force to axially move the escapement guide 5 back to its retracted neutral position. Thus the cam follower 10 no longer strikes the glide surface 8 and remains in the idle well 4 and the ram 11 is again held in its up position by the detent assembly 13.

The design of an idle well and work groove for a typical preferred embodiment of a mechanical press is accomplished by applying standard industry design techniques to the basic requirements for shut height, stroke length, and number of strokes or revolutions per minute. For example, a cam mechanism for a 2,721.55 Kg (3 ton) press requiring a 13.97 cm (5.5 inches) shut height, an 3.81 cm (1.5 inches) stroke length, and a stroke rate of 280 strokes per minute or 280 revolutions per minute would have the following design parameters:

- flywheel/cam diameter: 25.40 cm (10 inches);
- idle well diameter: 6.35 cm (2.5 inches);
- cam follower diameter: 2.54 cm (1 inch).

The design would also require that the work groove intersect the idle well at entry and exit angles of 40 degrees, that the work slope on the cam be 5.08 cm (2 inches) long and that the radius of the work slope increase from 6.03 cm (2.375 inches) to 6.67 cm (2.625 inches) in 0.64 cm (0.25 inches) of the work stroke.

The second embodiment of the invention is applicable to Group A machines and is depicted in FIGS. 5, 6, 7 and 8. The four views show an embodiment that is comprised of the same four major elements as in embodiment one: a circular flat-plate cam 20; an escapement guide 24; a cam follower 39; and a ram 31. The only difference between embodiment one and embodiment two is that the cam 20 has two work grooves 21 and 22 rather than one; and the escapement guide 24 has two glide surfaces 27 and 28 rather than one.

The cam 20 has on its front face a circular recessed idle well 23 with an escapement bore 25 centrally located within the idle well 23 and extending through the cam 20. The cam also has on its front face the first recessed cycloidal work groove 21 and the second recessed cycloidal work groove 22, both located outside the periphery of the idle well 23 and where each intersect the idle well 23 at angles selected to allow the cam follower 39 to glide smoothly from the idle well 23 into the work grooves 21 and 22 and back again into the idle well 23. The cam 20 in this embodiment, as shown in the FIGS. 5 and 6, may function as a flywheel or the cam may be comprised of separate plate sections that can be quickly mounted and dismounted from a separate flywheel. The escapement guide 24 consists of a plate section 26 having the first glide surface 27 on the side adjacent to the entry intersection of the first work groove 21 and the second glide surface 28 at the opposite end of the plate 26 and located adjacent to the entry site intersection of the second work groove 22. The plate 26 also has a recessed step area 30 at the second glide surface 28. As in the first embodiment the escapement guide 24 has a push-rod section 29 that perpendicularly extends from the backside of the plate section 26. The push rod 29 projects through the escapement bore 25 which is a part of the flywheel support shaft 36.

Figure 7:
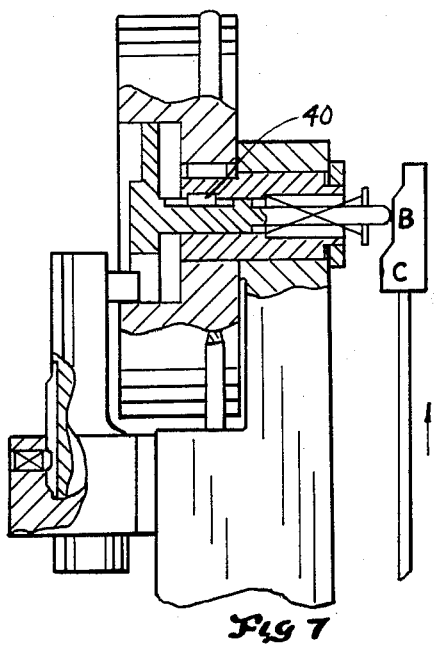

The escapement guide 24 is located and slidably fits in the idle well 23 and in its neutral position is retracted to the bottom of the idle well 23 held there by the spring assembly 29. When the escapement guide 24 is in meutral the cam follower 39 clears the two glide surfaces 27 and 28 of the escapement guide 24 and remains positioned in the idle well 23. The escapement guide 24 is axially moveable and radially fixed with the radial fixing accomplished by conventional means such as by the use of a woodruff key 40 as shown in FIG. 7. The cam follower 39 is attached to one end of the ram 31. The ram 31 is a bar that transfers the energy from the cam follower 39 to the work area and is held in the up neutral position by the ram detent assembly 33 located in the ram guide 32.

The operation is identical to embodiment one and can best be understood by describing a typical operational cycle which consists of an idle mode and a work mode. In both modes the cam 20 is rotated by a conventional motor (not shown) and a V-belt 34 combination.

Figure 6:
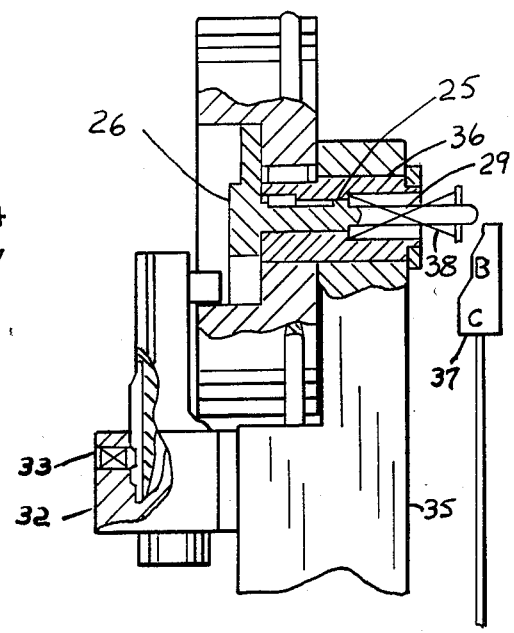

In the idle mode the actuator 37 is in its neutral "A" position, as shown in FIG. 6, applying no force to the push rod 29 of the escapement guide 24. Thus the escapement guide 24 remains in its retracted position resting at the bottom of the idle well 23 and held there by the spring assembly 38. The cam follower 39 is held motionless in its neutral position in the idle well 23 clearing both glide surfaces 27 and 28 as the cam 20 rotates, and the ram is held in its up neutral position by the ram detent assembly 33.

Figure 8:
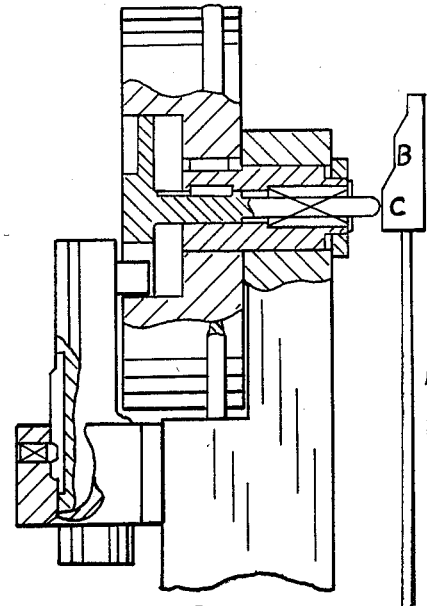

The work mode is set in motion by repositioning the actuator 37 to position "B" as shown in FIG. 7. The actuator 37 forces the push rod 29 to axially displace the escapement guide 24 into its first extended position causing the cam follower 39 to strike the first glide surface 27 of the escapement guide 24. The cam follower 39 then slidably transfers from the idle well 23 into the entry end of the first work groove 21 and dislodges the ram 31 from its up position. As the cam 20 continues to rotate the cam follower 39 and the ram 31 follow the contour of the first work groove 21 and the cam follower 39 exits at the other end of the first work groove 21 and back into the idle well 23. When the actuator 37 is in position "B" the cam follower 39 only strikes the first glide surface 27 because the recessed stepped area 30 at the second glide surface 28 provides sufficient clearance so that the cam follower 39 does not strike the second glide surface 28. Therefore on each rotation of the cam 20 the cam follower 39 only enters and leaves the first work groove 21. When it is desired to utilize both the first and second work grooves 21 and 22 during each revolution of the cam 20 the actuator 37 is placed in position "C" as shown in FIG. 8. The actuator 37 then forces the push rod 29 to axially displace the escapement guide 24 into its second extended position causing cam follower 39 to strike both the first glide surface 27 and second glide surface 28 of the escapement guide 24. Cam follower 39 then slidably transfers from the idle well 23 into the entry end of both work grooves 21 and 22. When it is desired to stop the work mode the actuator 37 is returned to position "A" whereupon the spring assembly 38 applies forces to axially move the escapement guide 24 back to its retracted neutral position. Thus the cam follower 39 no longer strikes either glide surface 27 or 28 and remains in the idle well 23 and the ram 31 is again held in its up position by the detent assembly 33.

Figures 9, 10:
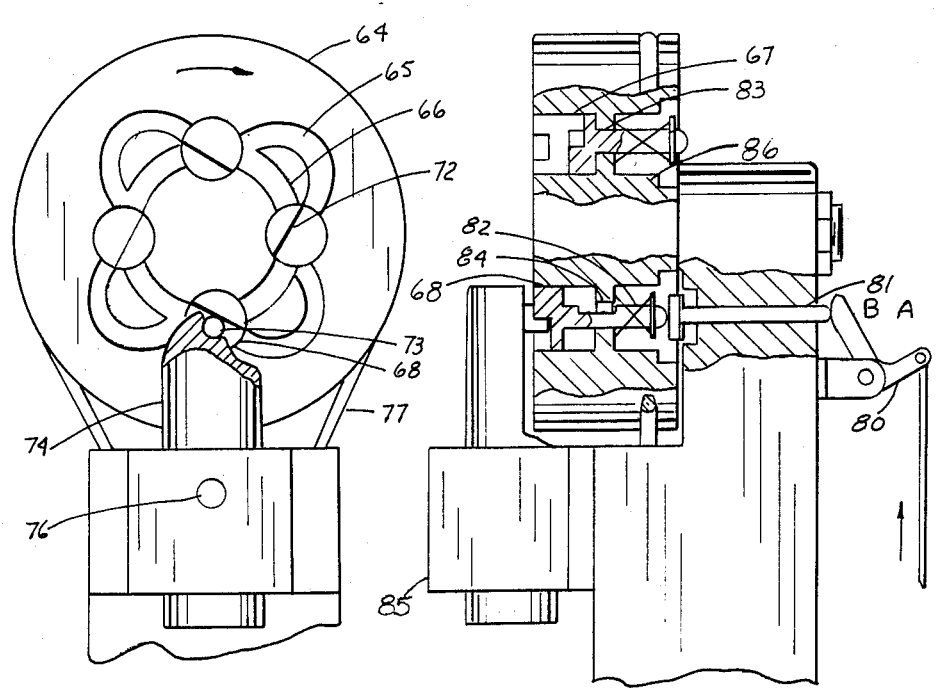

The third embodiment of the invention is applicable to Group A machines and is depicted in FIGS. 9 and 10. The two views show an embodiment that is comprised of the same four major elements as in embodiment one: a circular flat-plate cam 64; an escapement guide 68; a cam follower 73; and a ram 74. FIGS. 9 and 10 show a plurality of work grooves, escapement wells, and escapement guides. However, for purposes of describing the elements and operation of this embodiment reference is made to only one work groove 65, one escapement well 67, and one escapement guide 68. The difference between embodiment one and embodiment three is that the cam 64 has a circular recessed idle groove 66 located midway between the center and periphery of the cam 64, rather than a central idle well; has at least two work grooves 65; has an escapement well 67 at each idle groove 66 and work groove 65 entry intersection; and the escapement guide 68 is a circular rod with a single glide surface.

The cam 64 has on its front face a circular recessed idle groove 66 located midway between the center and the periphery of the cam 64. The cam 64 also has on its front face at least two recessed cycloidal work grooves 65 located outside the periphery of the idle groove 66, and where each work groove 65 intersects its respective idle groove 66 at angles selected to allow the cam follower 73 to glide smoothly from the idle groove 66 into the work grooves 65 and back again into the idle groove 66. The cam 64, which in this embodiment also functions as a flywheel, has an escapement well 67 located at each idle groove 66 and work groove 65 intersection. A front escapement bore 83 of smaller diameter centrally located within the escapement well 67 and a rear escapement bore 86 of larger diameter extending through the cam 64. The escapement guide 68 consists of a circular rod having a front section of greater diameter than the back section and whose front section has a recessed stepped area, where the vertical step with respect to the face of the cam, comprises the glide surface 72.

The escapement guide 68 is located and slidably fits in the escapement well 67 and in its neutral position is retracted to the bottom of the escapement well 67 held there by the spring assembly 82. The back section of the escapement guide 68 projects through the front escapement bore 83 and rear escapement bore 86. In the neutral position the cam follower clears the glide surface 72 of the escapement guides 68 and remains positioned in the idle groove 66. The escapement guide 68 is axially moveable and radially fixed with the radial fixing accomplished by conventional means such as by the use of a woodruff key 84, as shown in FIG. 10. The cam follower 73 is attached to one end of the ram 74. The ram 74 is a bar that transfers the energy from the cam follower 73 to the work area and is held in the up neutral position by the ram detent assembly 76 located in the ram guide 85.

The operation is identical to embodiment one and can best be understood by describing a typical operational cycle which consists of an idle mode and a work mode. In both moves the cam 64 is rotated by a conventional motor (not shown) and a V-belt 77 combination.

In the idle mode the actuator 80 is in its neutral position "A" applying no force to the back section of escapement guide 68. Thus the escapement guide 68 remains in its retracted position resting at the bottom of the escapement well 67 and held there by the spring assembly 82. The cam follower 73 is held motionless in its neutral position in the idle groove 66 clearing the glide surface 72 as the cam 64 rotates and the attached ram 74 is held in its up neutral position by the ram detent assembly 76.

The work mode is set in motion by positioning the actuator 80 to position "B" as shown in FIG. 10. The actuator 80 via a separate escapement push rod 81, forces the escapement guide 68 to axially displace the escapement guide 68 into its extended position causing the cam follower 73 to strike the glide surface 72 of the escapement guide 68. The cam follower 73 then slidably transfers from the idle groove 66 into the entry end of work groove 65 and dislodges the ram 74 from its up position. As the cam 64 continues to rotate the cam follower 73 and the ram 74 follow the contour of the work groove 65 and the cam follower 73 exits at the other end of the work groove 65 and back into the idle groove 66. If continued work cycles are desired the actuator 80 is allowed to remain in position "B" which keeps the escapement guide 68 in its extended position whereupon each revolution of the cam 64 the cam follower 73 will strike each glide surface 72 and enter and exit each work groove 65. When it is desired to stop the work mode the actuator 80 is returned to its neutral position "A" which removes the force from the escapement guide 68. The spring assembly 82 axially moves the escapement guide 68 back to its retracted neutral position. Thus the cam follower 73 no longer strikes the glide surface 72 and remains in the idle groove 66 and the ram 74 is again held in its up position by the detent assembly 76.

Figure 11:
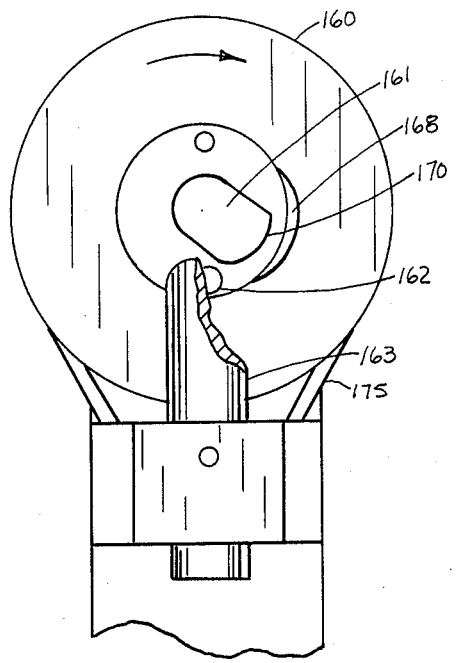
Figure 12:
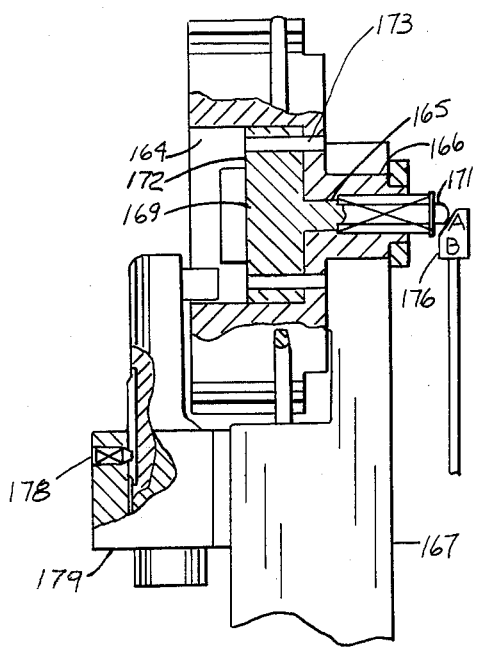
Figure 13:
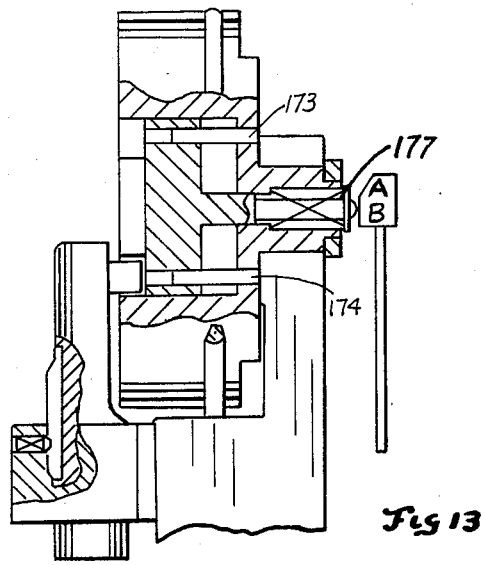

The fourth embodiment of the invention is applicable to Group A machines and is depicted in FIGS. 11, 12 and 13. This is the special short-stroke version of the invention. The three views show an embodiment that is comprised of the same four major elements as in embodiment one: a circular flat-plate cam 160; an escapement guide 172; a cam follower 162; and a ram 163. The difference between embodiment one and embodiment four is in the makeup of the work groove 168 and the configuration and function of the escapement guide 172. In this embodiment the escapement guide 172 glide surface 170 is lengthened and becomes the inner wall of the work groove 168 and the outer wall of the work groove 168 is a section that is partially cutaway from the upper portion and side of the idle well 164 perimeter faceing the glide surface 170.

The cam 160 has on its front face a circular recessed idle well 164 with an escapement bore 165 centrally located within the idle well 164 and extending through the cam 160 and the modified work groove 168 described in the previous paragraph. The cam in this embodiment also functions as a flywheel. The cam 160 has two pins 173 and 174 which are permanently attached to the cam 160 and extend inwardly into the idle well 164. The escapement guide 172 is comprised of three cylindrical sections: a center section 169; an upper section 161 extending from the center section 169 where one side of the upper section 161 is the glide surface 170 which faces the partially cutaway section from the perimeter of the idle well 164; and a push-rod section 171 that perpendicularly extends from the backside of the plate section 169. The center section 169 also has two bores 181 extending therethrough.

The center section 169 of the escapement guide 172 is located and slidably fits in the idle well 164 with the two pins 173 and 174 slidably fitting into the two bores 181 in the center section 169; and in its neutral position is retracted to the bottom of the idle well 164 held there by the spring assembly 177. The push-rod section 171 projects through the escapement bore 165 which is a part of the flywheel support shaft 166. In the neutral position the cam follower 162 clears the glide surface 170 of the escapement guide 172 and remains positioned in the idle well 164. The escapement guide 172 is axially moveable and radially fixed with the radial fixing accomplished by the two pins 173 and 174. The cam follower 162 is attached to one end of the ram 163. The ram 163 is a bar that transfers the energy from the cam follower to the work area and is held in the up neutral position by the ram detent assembly 178 located in the ram guide 179.

The operation of the short-stroke embodiment can best be understood by describing a typical operational cycle which consists of an idle mode and a work mode. In both modes the cam is rotated by a conventional motor (not shown) and a V-belt 175 combination.

In the idle mode the actuator 176 is in its neutral position "A" as shown in FIG. 12 applying no force to the push rod 171 of the escapement guide 172. Thus the escapement guide 172 remains in its neutral position resting at the bottom of the idle well 164 and held there by the spring assembly 177. The cam follower 162 is held motionless in its neutral position in the idle well 164, clearing the glide surface 170 as the cam 160 rotates, and the ram 163 is held in its up neutral position by the ram detent assembly 178.

The work mode is set in motion by repositioning the actuator 176 to position "B" as shown in FIG. 13. The actuator 176 forces the push rod 171 to axially displace the escapement guide 172 into its extended position causing cam follower 162 to strike the glide surface 170 of the escapement guide 172. The cam follower 162 slidably travels between the longer glide surface 170, serving as the inner wall of the work groove 168, and the cutaway section of the idle well 164 perimeter, serving as the outer wall of the work groove 168. This action of the cam follower 162 dislodges the ram 163 from its up position. As the cam 160 continues to rotate the cam follower 162 and ram 163 follow the contour of the work groove 168 and the cam follower 162 eventually leaves the work groove 168, back into the idle well 164. If more than one work cycle is desired the actuator 176 is allowed to remain in position "B" which keeps the escapement guide 172 in its extended position whereupon each revolution of the cam 160 the cam follower 162 follows the contour of the work groove 168. When it is desired to stop the work mode the actuator 176 is returned to position "A" whereupon the spring assembly 177 applies force to axially move the escapement guide 172 back to its retracted neutral position. Thus the cam follower 162 no longer strikes the glide surface 170 and remains in the idle well 164 and the ram 163 is again held in its up position by the detent assembly 178.

Figures 14, 15:
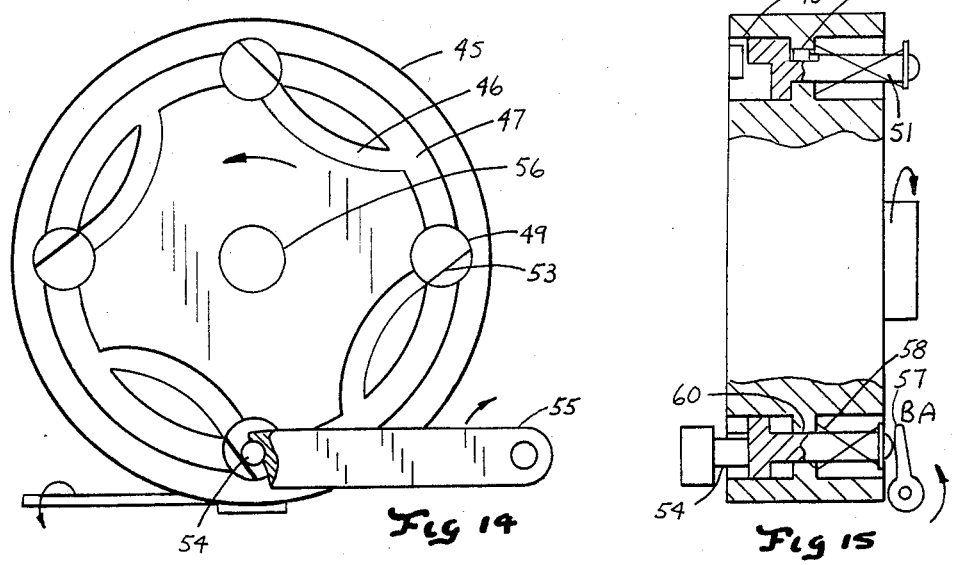

The fifth embodiment of the invention is applicable to Group B machines and is depicted in FIGS. 14 and 15. The two views show an embodiment that is comprised of basically the same four major elements as in embodiment one: a circular flat-plate cam 45; an escapement guide 49; a cam follower 54; and a lever 55. The difference between embodiment one and embodiment five is that the cam 45 has a circular recessed idle groove 47 located near the periphery of the cam 45 rather than a central idle well, has at least two work grooves 46, has at least two escapement wells 48, the escapement guide 49 is a circular rod with a single glide surface, and a lever rather than a ram is used to perform the work.

The cam 45 has on its front face a circular recessed idle groove 46 located near the periphery of the cam 45 with at least two recessed cycloidal work grooves 46 located inwardly from the idle groove 47. Each work groove 46 intersects the idle groove 47 at angles selected to allow the cam follower 54 to glide smoothly from the idle groove 47 into the work groove 46 and back again into the idle groove 47. The cam 45 in this embodiment also functions as a flywheel. The cam 45 has an escapement well 48 located at each entry intersection of the idle groove 47 and the work groove 46, and a front escapement bore 60 of smaller diameter centrally located within the escapement well 48 and a rear escapement bore 58 of larger diameter extending through the cam 45. The escapement guide 49 consists of a circular rod having a front section of greater diameter than the back section and whose front section has a recessed stepped area, where the vertical step with respect to the face of the cam 45 comprises the glide surface 53.

The escapement guide 49 is located and slidably fits in the escapement well 48 and in its neutral position is retracted to the bottom of the escapement well 48 held there by the spring assembly 51. The back section of each escapement guide 49 projects through its respective front escapement bore 60 and rear escapement bore 58 extending out the rear of the cam 45. In the neutral position the cam follower 54 clears the glide surface 53 of the escapement guide 49 and remains positioned in the idle groove 47. The escapement guide 49 is axially moveable and radially fixed with the radial fixing accomplished by conventional means such as by the use of a woodruff key 59. The cam follower 54 is attached to one end of the lever 55. The lever 55 transfers the reciprocal movements to the work area.

The operation is identical to the preferred embodiment one and can best be understood by describing a typical operational cycle which consists of an idle mode and a work mode. In both modes the cam 45 is made to rotate by a center shaft 56 driven by a conventional motor (not shown).

In the idle mode the actuator 57 is in its neutral position "A" applying no force to the back section of escapement guide 49. Thus the escapement guide 49 remains in its retracted position resting at the bottom of the escapement well 48 and held there by the spring assembly 51. The cam follower 54 is held motionless in its neutral position in the idle groove 47 clearing the glide surface 53 as the cam 45 rotates and the attached lever 55 is in its neutral position with no reciprocal movement.

The work mode is set in motion by repositioning the actuator 57 to position "B" as shown in FIG. 15. The actuator 57 forces the escapement guide 49 into its extended position causing cam follower 54 to strike the glide surface 53 of the escapement guide 49. The cam follower 54 then slidably transfers from the idle groove 47 into the entry end of the work groove 46 and moves lever 55. As the cam 45 continues to rotate the cam follower 54 and the lever 55 follow the contour of the work groove 46 and the cam follower 54 exits at the other end of the work groove 46 and back into the idle groove 47. If continued work cycles are desired the actuator 57 is allowed to remain in position "B" which keeps the escapement guide 49 in its extended position whereupon each revolution of the cam 45 the cam follower 54 strikes each glide surface 53 and enters and exits each work groove 46. When it is desired to stop the work mode the actuator 57 is repositioned to its neutral position "A" which removes the force from the escapement guide 49. The spring assembly 51 axially moves the escapement guide 49 back to its retracted neutral position. Thus the cam follower 54 no longer strikes the glide surface 53 and remains in the idle groove 47 and the lever 55 is again located in its neutral position.

The sixth embodiment of the invention is applicable to Group B machines and is depicted in FIGS. 16, 17, 25, 26 and 27. The five views show an embodiment that is comprised of basically the same four major elements as in embodiment one: a circular flat-plate cam 88; an escapement guide 92; a cam follower 97; and a lever 98. The difference between embodiment one and embodiment six is that the cam has a circular recessed idle groove 91 rather than a central idle well, has at least two work grooves 90, has at least two escapement wells 101, has an oscillating escapement guide 92, and a lever 98 rather than a ram is used to perform the work.

The cam 88 has on its front face a circular recessed idle groove 91 located midway between the center and the periphery of the cam 88. The cam 88 also has on it front face at least two recessed cycloidal work grooves 90 located inwardly of the idle groove 91 and at least two recessed cycloidal work grooves 89 located outwardly of the idle groove 91; and where each work groove 89 and 90 intersect the idle groove 91 at angles selected to allow the cam follower 97 to glide smoothly from the idle groove 91 into the work grooves 89 and 90 and back again into the idle groove 91. The cam 88 in this embodiment also functions as a flywheel. The cam 88 has escapement wells 101 located at each entry intersection of the idle groove 91 and each work groove 89 and 90 and a front escapement bore 102 of smaller diameter centrally located within the escapement well 101 and a rear escapement bore 103 extending through the cam 88. The escapement guide 92 consists of a two section circular rod having an oscillating front section 105 and a radially fixed back section 96, which also functions as a push rod, where the radial fixing is accomplished by conventional means. The front section 105 has a recessed stepped area where the vertical step, with respect to the face of the cam 88, comprises the glide surface 93 and where the non-recessed area has a semicircular slot 95 extending therethrough. The front section 105 also has a centrally located rod well 106 on its frontside and a centrally located rod of smaller diameter extending from its backside. The back section 96 has a centrally located rod of smaller diameter extending from its backside. The back section 96 also has a guide pin 94 attached to its frontside by conventional means such as by threads. When the front section 105 and back section are functionally joined the rod from the front section 105 rotatably fits into the rod well 106 in the back section and the guide pin 94 slidably fits within the semicircular slot 95 to limit the radial oscillatory travel of the front guide 105.

The escapement guide 92 is located and slidably fits in the escapement well 101 and in its neutral position is retracted to the bottom of the escapement well 101 held there by the spring assembly 100. In the neutral position the cam follower 97 clears the glide surface 93 of the escapement guide 92 and remains positioned in the idle groove 91. The cam follower is attached to one end of the lever 98. The lever 98 transfers the reciprocal movements to the work area.

The operation is basically the same as embodiment one and can best be understood by describing a typical operational cycle which consists of an idle mode and a work mode. In both modes the cam 88 is made to rotate by a center shaft 104 driven by a conventional motor (not shown).

In the idle mode the actuator 99 is in its neutral position "A" applying no force to the back section 96 of the escapement guide 92. Thus the escapement guide 92 remains in the retracted position resting at the bottom of the escapement well 101 and held there by the spring assembly 100. The cam follower 97 is held motionless in its neutral position in the idle groove 91 clearing the glide surface 93 as the cam 88 rotates and the attached lever 98 is in its neutral position with no reciprocal movement.

Figure 26:
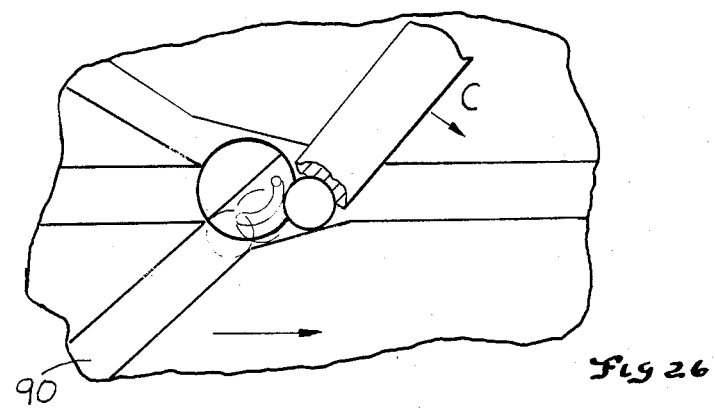
Figure 27:
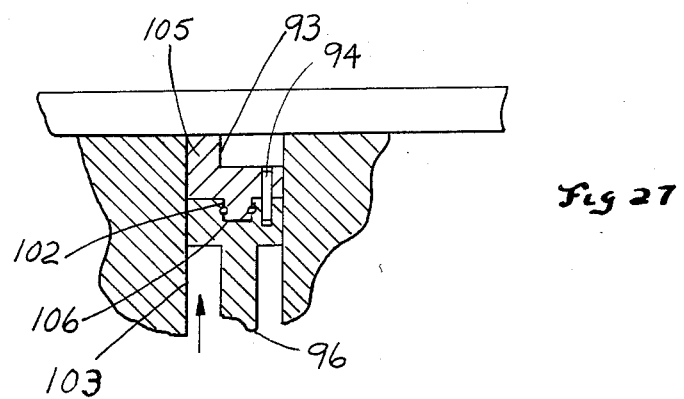

The work mode is set in motion by first applying a slight force on the lever 98 is the direction of the letter "C" as shown in FIG. 16 and then repositioning the actuator 99 to position "B" as shown in FIG. 17. The actuator 99 forces the escapement 92 to be axially displaced into its extended position causing cam follower 97 to strike the inward end of the glide surface 93 which causes cam follower 97 to transfer from the idle groove 91 into the inward work groove 90 as shown in FIGS. 16 and 26. As the cam 88 continues to rotate the cam follower 97 and the lever 98 follow the contour of the inward work groove and the cam follower 97 eventually exits at the other end of the work groove 90 back into the idle groove 91. If continued work cycles in the inward work groove are desired the force on the lever 98 in the direction of letter "C" is maintained and the actuator 99 is allowed to remain in position "B" as shown in FIG. 17 which keeps the escapement guide 92 in the extended position whereupon each revolution of the cam the cam follower 97 will strike each inward end of the glide surface 93 and enter and exit each inward work groove 90. When it is desired to utilize the outward work groove 89 a slight force on the lever 98 in the direction of the letter "D" as shown in FIG. 16 is applied which allows the cam follower 97 to strike the outward end of the glide surface 93 and enter and exit each outward work groove 89. When it is desired to stop the work mode the actuator is repositioned to its neutral position "A" which removes the force from the escapement guide 92. The spring assembly 100 axially moves the escapement guide 92 back to its retracted neutral position. Thus the cam follower 97 no longer strikes the glide surface 93 and remains in the idle groove 91 and the lever 98 is again in its neutral position.

The seventh embodiment of the invention is applicable to Group B machines and is depicted in FIGS. 18, 19 and 20. The three views show an embodiment that is comprised of basically the same four major elements as in embodiment one: a cylindrical drum cam 106; an escapement guide 109; a cam follower 111; and a lever 112. The difference between embodiment one and embodiment seven is that the cam 106 is a cylindrical drum rather than a flat plate; has a circular recessed peripheral idle groove 108 rather than a central idle well; and a lever 112 rather than a ram is used to perform the work.

The cam 106 is cylindrical drum type and has a recessed peripheral idle groove 108 located on one end of the cam 108 as shown in FIG. 18. The cam 108 has on its drum surface a recessed cycloidal work groove 107 that intersects the idle groove 108 at angles selected to allow the cam follower 111 to glide smoothly from the idle groove 108 into the work groove 107 and back again into the idle groove 108. The cam 106 in this embodiment also functions as a flywheel. The cam 106 has an escapement well 119 located at the entry intersection of the idle groove 108 and the work groove 107. The escapement guide 109 consists of a circular rod having a recessed stepped area, where the vertical step with respect to the rotational axis of the cam 106 comprises the glide surface 110, and a displacement pin 117 perpendicularly attached to the side of the escapement guide 109.

The escapement guide 109 is located and slidably fits in the escapement well 119 and in its neutral position is retracted to the bottom of the escapement well 119 held there by the spring assembly 115. In the neutral position the cam follower 111 clears the glide surface 110 of the escapement guide 109 and remains positioned in the idle groove 107. The escapement guide 109 is axially moveable and radially fixed within the escapement well 119 with the radial fixing accomplished by conventional means such as by a woodruff key. The cam follower 111 is attached to one end of the lever 112. The lever 112 transfers the reciprocal movements to the work area.

The operation is basically the same as embodiment one and can best be understood by describing a typical operational cycle which consists of an idle mode and a work mode. In both modes the cam 106 is made to rotate by a center shaft 114 driven by a conventional motor (not shown).

The operation is basically the same as embodiment one and can best be understood by describing a typical operational cycle which consists of an idle mode and a work mode. In both modes the cam 106 is made to rotate by a center shaft 114 driven by a conventional motor (not shown).

In the idle mode the actuator 113 is in its neutral position "A" applying no force to displacement pin 117 of the escapement guide 109. Thus the escapement guide 109 remains in its neutral position resting at the bottom of the escapement well 119 held there by the spring assembly 115. The cam follower 111 is held motionless in its neutral position in the idle groove 108 clearing the glide surface 110 as the cam 106 rotates and the attached lever 112 is in its neutral position with no reciprocal movement.

The work mode is set in motion by repositioning the actuator 113 to position "B" as shown in FIG. 19. This forces escapement guide 109 into its extended position, as shown in FIG. 20, causing cam follower 111 to strike the glide surface 110 of the escapement guide 109. The cam follower 111 then slidably transfers from the idle groove 108 into the entry end of the work groove 107 and moves lever 112. As the cam 106 continues to rotate the cam follower 111 and the lever 112 follow the contour of the work groove 107 and the cam follower 111 exits the other end of the work groove 107 and back into the idle groove 108. If continued work cycles are desired the actuator 113 is allowed to remain in position "B" which maintains the escapement guide 109 in its extended position whereupon each revolution of the cam 106 the cam follower 111 will strike the glide surface 110 and enter and exit the work groove 107. When it is desired to stop the work mode the actuator 113 is repositioned to its neutral position "A" which removes the force from the escapement guide 109. The spring assembly 115 axially moves the escapement guide 109 back to its retracted neutral position. Thus the cam follower 111 no longer strikes the glide surface 110 and remains in the idle groove 108 and the lever 112 is again in its neutral position.

Figures 21, 22:
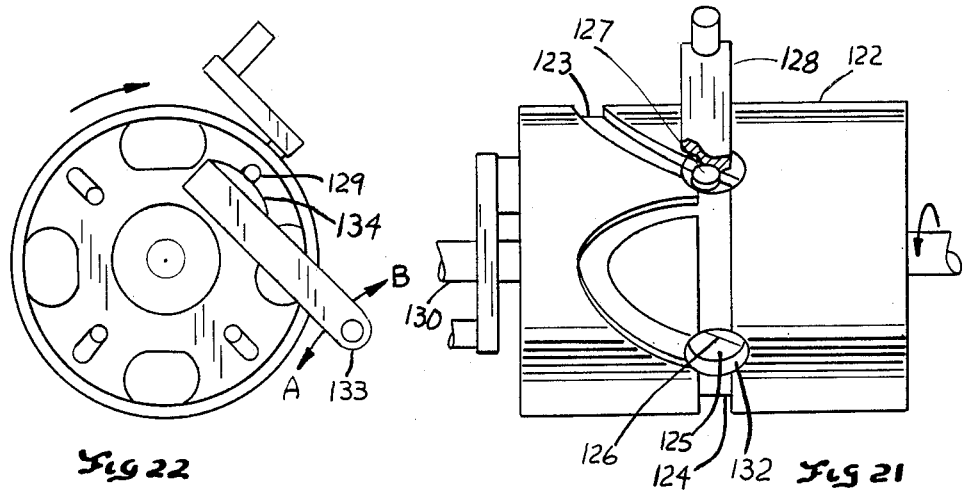

The eighth embodiment of the invention is applicable to Group B machines and is depicted in FIGS. 21 and 22. The two views show an embodiment that is comprised of basically the same four major elements as embodiment one: a cylindrical drum cam 122; an escapement guide 125; a cam follower 127; and a lever 128. The difference between embodiment one and embodiment eight is that the cam 122 is a cylindrical drum rather than a flat plate; has circular peripheral idle groove 124 rather than a central idle well; has at least two work grooves 123; has at least two escapement wells 132 and two escapement guides 125; and a lever 128 rather than a ram is used to perform the work.

The cam 122 is cylindrical drum type and has a recessed peripheral idle groove 124 located midway between each end of the cam 122. The cam has on its drum surface at least two recessed cycloidal work grooves 123 located inwardly from the idle groove, and each intersect the idle groove 124 at angles selected to allow the cam follower 127 to glide smoothly from the idle groove 124 into the work grooves 123 and back again into the idle groove 124. The cam 122 in this embodiment also functions as a flywheel. The cam 122 has escapement wells 132 located at each entry intersection of an idle groove 124 and work groove 123. The escapement guide 125 consists of a circular rod having a recessed stepped area, where the vertical step with respect to the rotational axis of the cam 122 comprises the glide surface 126; and a displacement pin 129 perpendicularly attached to the side of the escapement guide 125.

The escapement guide 125 is located and slidably fits in the escapement well 132 and in its neutral position is retracted to the bottom of the escapement well 132 held there by spring assembly 134. In the neutral position the cam follower 127 clears the glide surface 126 of the escapement guide 125 and remains positioned in the idle groove 124. The escapement guide 125 is axially moveable and radially fixed within the escapement well 132 with the radial fixing accomplished by conventional means such as a woodruff key. The cam follower 127 is attached to one end of the lever 128. The lever 128 transfers the reciprocal movements to the work area.

The operation is basically the same as embodiment one and can best be understood by describing a typical operational cycle which consists of an idle mode and a work mode. In both modes the cam 122 is made to rotate by a center shaft 130 driven by a conventional motor (not shown).

In the idle mode the actuator 133 is in its neutral position "A" applying no force to displacement pin 129 of the escapement guide 125. Thus the escapement guide 125 remains in its neutral position resting at the bottom of the escapement well 132. The cam follower 127 is held motionless in its neutral position in the idle groove 124 clearing the glide surface 126 as the cam 122 rotates and the attached lever 128 is in its neutral position with no reciprocal movement.

The work mode is set in motion by repositioning the actuator 133 to position "B" as shown in FIG. 22. This forces escapement guide 125 into its extended position causing the cam follower 127 to strike the glide surface 126 of the escapement guide 125. The cam follower 127 then slidably transfers from the idle groove 124 into the entry end of the work groove 123 and moves lever 128. As the cam 122 continues to rotate the cam follower 127 and the lever 128 follow the contour of the work groove 123 and the cam follower 127 exits the other end of the work groove 123 and back into the idle groove 124. If continued work cycles are desired the actuator 133 is allowed to remain in position "B" which maintains the escapement guide 125 in its extended position whereupon each revolution of the cam 122 the cam follower 127 will strike each glide surface 126 and enter and exit each work groove 123. When it is desired to stop the work mode the actuator 133 is repositioned to its neutral position "A" which removes the force from the escapement guide 125. The spring assembly 134 axially moves the escapement guide back to its retracted neutral position. Thus the cam follower 127 no longer strikes the glide surface and remains in the idle groove and the lever 128 is again in its neutral position.

The ninth embodiment of the invention is applicable to Group B machines and is depicted in FIGS. 23, 24, 25, 26 and 27. The five views show an embodiment that is comprised of basically the same four major elements as embodiment one: a cylindrical drum cam 138; an escapement guide 92; a cam follower 145; and a lever 146. The difference between embodiment one and embodiment nine is that the cam 138 is a cylindrical drum rather than a flat plate; has a circular recessed idle groove 140 rather than a central idle well; has at least two work grooves 139; has at least two escapement wells 153; has an oscillating escapement guide 92; and a lever 146 rather than a ram is used to perform the work.

The cam 138 is a cylindrical drum type and has a recessed peripheral idle groove 140 located midway between each end of the cam 138. The cam 138 has on its drum surface at least two recessed cycloidal work grooves 139 located on the right side relative to the idle groove 140 and at least two recessed cycloidal work grooves 156 located on the left side relative to the idle groove 140, and where each work groove intersects the idle groove 140 at angles selected to allow the cam follower 145 to glide smoothly from the idle groove 140 into the work grooves and back again into the idle groove 140. The cam 138 in this embodiment also functions as a flywheel. The cam 138 has escapement wells 153 located at each entry intersection of an idle groove 140 and work groove 139 and 156, and a front escapement bore 102 of smaller diameter centrally located within the escapement well 153 and a rear escapement bore 103 extending through the wall of the cam 138. The escapement guide 92 consists of a two section circular rod having an oscillating front section 105 and a radially fixed back section 96, which also functions as a push rod, where the radial fixing is accomplished by conventional means such as by the use of a woodruff key. The front section 105 has a recessed stepped area where the vertical step with respect to the face of the cam 88 comprises the glide surface 93 and where the non-recessed area has a semicircular slot 95 extending therethrough. The front section 105 also has a centrally located rod of smaller diameter extending from its backside. The back section 96 has a centrally located rod well 106 on its frontside and a centrally located rod of smaller diameter extending from its backside. The back section 96 also has a guide pin 94 attached to its frontside by conventional means such as by threads. When the front section 105 and back section are functionally joined the rod from the front section 105 rotatably fits into the rod well 106 in the back section and the guide pin 94 slidably fits within the semicircular slot 95 to limit the radial oscillatory travel of the front guide 105.

The escapement guide 92 is located and slidably fits in the escapement well 153 and in its neutral position is retracted to the bottom of the escapement well 153 held there by a spring assembly or other urging means. In the neutral position the cam follower 145 clears the glide surface 93 of the escapement guide 92 and remains positioned in the idle groove 140. The cam follower 145 is attached to one end of the lever 146. The lever 146 transfers the reciprocal movements to the work area.

The operation is basically the same as embodiment one and can best be understood by describing a typical operational cycle which consists of an idle mode and a work mode. In both modes the cam 138 is made to rotate by a center shaft 148 driven by a conventional motor (not shown).

In the idle mode the actuator 147 is in its neutral position "A" applying no force to the back section 96 of the escapement guide 92. Thus the escapement guide 92 remains in its neutral position resting at the bottom of the escapement well 153. The cam follower 145 is held motionless in its neutral position in the idle groove 140 clearing the glide surface 93 as the cam 138 rotates and the attached lever 146 is in its neutral position with no reciprocal movement.

Figures 23, 24:
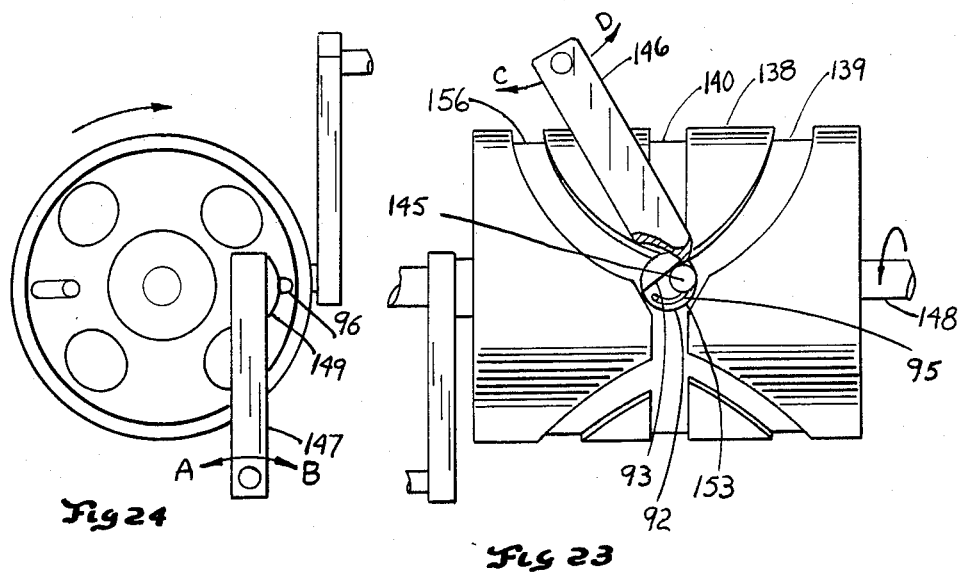
Figure 25:
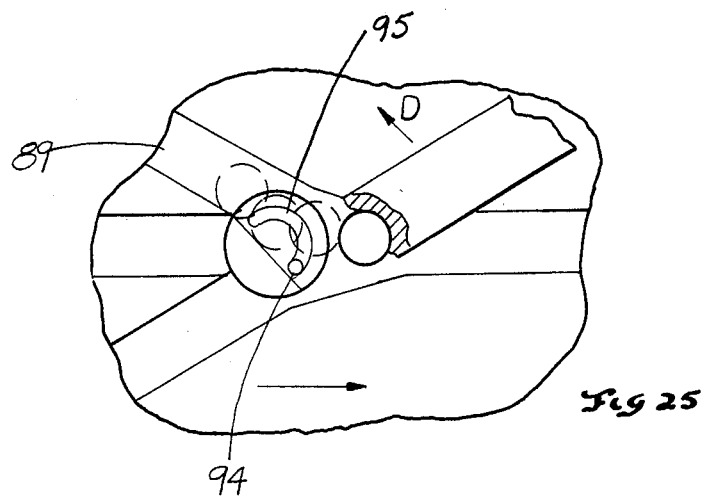

The work mode is set in motion by first applying a slight force on the lever 146 in the direction of letter "C" as shown in FIG. 23 and then repositioning the actuator 147 to position "B" as shown by the arrow in FIG. 24. The actuator 147 forces the push-rod pin 96 to axially displace the escapement guide 92 into its extended position causing cam follower 145 to strike the inward end, corresponding to right work groove 134, of the glide surface 93 which causes cam follower 145 to transfer from the idle groove 140 into the right work groove 139 and the cam follower 145 eventually exits at the other end of the work groove 139 back into the idle groove 140. If continued work cycles in the right work groove 139 are desired the force on the lever 146 in the direction of letter "C" is maintained and the actuator 147 is allowed to remain in position "B" keeping the escapement guide 92 in the extended position whereupon each revolution of the cam 138 the cam follower 145 will strike the inward end of the glide surface 93 and enter and exit each right work groove 139. When it is desired to utilize the left work groove 156 a slight force on the lever 146 in the direction of letter "D" as shown in FIG. 23 is applied and the cam follower 145 will strike the outward end, corresponding to the left work groove 156, of the glide surface 93 and enter and exit each left work groove 156. When it is desired to stop the work mode the actuator 147 is repositioned to its neutral position "A" which removes the force from the escapement guide 92 causing the escapement guide 92 to axially move back to its retracted neutral position. Thus the cam follower 145 no longer strikes the glides surface 93 and remains in the idle groove 140 and the lever 146 is again in its neutral position.

I claim:

1. A mechanism for controlling the operation of machines comprising:
   (a) a cam having a recessed idle area and having at least one recessed cycloidal work groove where the ends of the work groove intersect the idle area;
   (b) the idle area consists of having a circular idle well centrally located on said cam and having a bore centrally located within the idle well and extending therethrough;
   (c) the work groove consists of having a single cycloidal work groove located outside the periphery of the idle well;
   (d) means for rotating said cam;
   (e) a cam follower engaged alternately in the idle area or the work groove;
   (f) an escapement guide consisting of a device having at least one glide surface, where the glide surface is located at an entry intersection of the idle area and a cycloidal work groove, and where said escapement guide is selectively positionable whereby, when placed in an idle mode position said cam follower clears the glide surface and remains in the idle area and when placed in a work mode position said cam follower strikes the glide surface causing said cam follower to slidably leave the idle area and transfer into a work groove;
   (g) said escapement guide is a single-glide-surface escapement guide consisting of a plate with a glide-surface located on side of plate, and a perpendicular push-rod extending from the backside of the plate, and where the plate is located within the idle well with the rod extending through the bore in the idle well, and where said escapement guide is radially fixed with respect to cam face and axially movable whereby, when said escapement guide is in a retracted position said cam follower clears the glide surface and remains in the idle well, and when said escapement guide is in an extended position said cam follower strikes the glide surface causing said cam follower to slidable leave the idle well and transfer into the work groove;
   (h) means for maintaining said escapement guide in a fixed radial position; and
   (i) means for axially extending and retracting said escapement guide
   (j) means for selectively positioning said escapement guide; and
   (k) a work shaft connected on one end to said cam follower and where other end operates a machine.

2. A mechanism for controlling the operation of machines comprising:
   (a) a cam having a recessed idle area having at least one recessed cycloidal work groove where the ends of the work groove intersect the idle area and where the idle area consists of having a circular idle well centrally located on said cam and having a bore centrally located within the idle well and extending therethrough, and where the work groove consists of having a first cycloidal work groove and a second work groove where both are located outside the periphery of the idle well area
   (b) means for rotating said cam;
   (c) a cam follower engaged alternately in the idle area or the work groove;
   (d) an escapement guide consisting of a device having at least one glide surface, where the glide surface is located at an entry intersection of the idle area and a cycloidal work groove, and where said escapement guide is selectively positionable whereby, when placed in an idle mode position said cam follower clears the glide surface and remains in the idle area and when placed in a work mode position said cam follower strikes the glide surface causing said cam follower to slidably leave the idle area and transfer into a work groove, where
   said escapement guide is a dual-glide-surface escapement guide consisting of a plate with a first glide surface on a first side of plate and with the opposite end of plate having a recessed stepped area where the second glide surface is located on a second side of step opposite the side of the first glide surface, and a perpendicular push-rod extending from the backside of the plate, and where the plate is located within the idle well with the rod extending through the bore in the idle well, and where said escapement guide is radially fixed with respect to the face of said cam and axially moveable whereby, when said escapement guide is in a retracted position said cam follower clears both glide surfaces and remains in the idle well, and when said escapement guide is axially extended to a position approximately midway between its retraced position and maximum extended position said cam follower clears the second glide surface and strikes the first glide surface causing said cam follower to slidably leave the idle well and transfer into the first work groove, and when said escapement guide is extended to a maximum axial position said cam follower strikes both the glide surfaces causing said cam follower to slidably leave the idle well and transfer, in turn, into the first and the second work groove;
   (e) means for selectively positioning said escapement guide; and
   (f) a work shaft connected on one end to said cam follower and where other end operates a machine.

3. A mechanism for controlling the operation of machines comprising:
   (a) a cam having a recessed idle area and having at least one recessed cycloidal work groove where the ends of the work groove intersect the idle area;
   (b) means for rotating said cam;
   (c) a cam follower engaged alternately in the idle area or the work groove;
   (d) an escapement guide consisting of a device having at least one glide surface, where the glide surface is located at an entry intersection of the idle area and a cycloidal work groove, and where said escapement guide is selectively positionable whereby, when placed in an idle mode position said cam follower clears the glide surface and remains in the idle area and when placed in a work mode position said cam follower strikes the glide surface causing said cam follower to slidably leave the idle area and transfer into a work groove;
   said escapement guide is a single-glide-surface escapement guide consisting of a cylindrical three-section rod where the upper section comprises said cam follower glide surface and inner wall of the work groove, where the center section is moveably inserted within the idle well, and where lower section is a perpendicular push-rod extending through the bore in the idle well, and where said escapement guide is radially fixed with respect to the face of said cam and axially moveable whereby, when said escapement guide is in a retracted position said cam follower clears the glide surface and remains in the idle well, and when said escapement guide is in an extended position said cam follower strikes the glide surface causing said cam follower to slidably leave the idle well and transfer into the work groove;

(e) the work groove consists of having a single work groove where the inner wall is the periphery of the glide surface of said escapement guide and where the outer wall is a section that is partially cutaway from the upper portion and side of the idle area perimeter facing the glide surface;

(f) means for selectively positioning said escapement guide; and (g) a work shaft connected on one end to said cam follower and where other end operates a machine.

4. A mechanism for controlling the operation of machines comprising:

(a) a cam having a recessed idle area and having at least one recessed cycloidal work groove where the ends of the work groove intersect the idle area; the idle area consists of having a circular idle groove located near the periphery of said cam; the work groove consists of having at least one cycloidal work groove located inside the periphery of the idle groove;

said cam having an escapement well located at the entry intersection of the idle groove and the work groove and also having a bore centrally located within the well and extending therethrough;

(b) means for rotating said cam;

(c) a cam follower engaged alternately in the idle area or the work groove;

(d) an escapement guide consisting of a device having at least one glide surface, where the glide surface is located at an entry intersection of the idle area and a cycloidal work groove, and where said escapement guide is selectively positionable whereby, when placed in an idle mode position said cam follower clear the glide surface and remains in the idle area and when placed in a work mode position said cam follower strikes the glide surface causing said cam follower to slidably leave the idle area and transfer into a work groove; said escapement guide is a single-glide-surface escapement guide consisting of a rod with front section being of greater cross section than the back section, and with front section of rod having a recessed stepped area where the vertical step, with respect to the face of said cam, comprises a glide surface, and where the front section of the rod is located within the well with the back section of rod extending through the bore in the well, and where said escapement guide is radially fixed with respect to the face of said cam and axially moveable whereby, when said escapement guide is in a retracted position said cam follower clears the glide surface and remains in the idle groove, and when said escapement guide is in an extended position said cam follower strikes the glide surface causing said cam follower to slidably leave the idle groove and transfer into the work groove;

(e) means for maintaining said escapement guide in a fixed radial position; and (f) means for axially extending and retracting said escapement guide.

(g) a work shaft connected on one end to said cam follower and where other end operates a machine, 5. A mechanism for controlling the operation of machines comprising:

(a) a cam having a recessed idle area and having at least one recessed cycloidal work groove where the ends of the work groove intersect the idle area; the idle area consists of having a circular idle groove located midway between the center and the periphery of said cam;

the work groove consists of having a plurality of cycloidal work grooves intersecting the idle groove in outward and inward excursions, relative to the idle groove;

said cam having a circular well located at the entry intersection of the idle groove and the work groove and also having a bore centrally located within the circular well and extending therethrough;

(b) means for rotating said cam;

(c) a cam follower engaged alternately in the idle area or the work groove;

(d) an escapement guide consisting of a device having at least one glide surface, where the glide surface is located at an entry intersection of the idle area and a cycloidal work groove, and where said escapement guide is selectively positionable whereby, when placed in an idle mode position said cam follower clears the glide surface and remains in the idle area and when place in a work mode position said cam follower strikes the glide surface causing said cam follower to slidably leave the idle area and transfer into a work groove;

said escapement guide is a single-glide-surface escapement guide, comprised of a radially oscillating front section, a radially fixed back section, and a guide pin, with the front section having a recessed stepped area where the vertical plane of step, with respect to the face of said cam, comprises the glide surface and with the non-recessed area having a semicircular slot extending therethrough, and a centrally located rod extending from the backside, and where the back section having a centrally located rod well and a centrally located rod extending from the backside and means for attaching the guide pin to the back section so that the rod from the front section rotatably fits into the rod well and the guide pin slidably fits within the semicircular slot to limit the radial oscillatory travel of the front guide and where said escapement guide is located within the circular well with the rod extending through the bore in the circular well and where said escapement guide is axially moveable whereby, when said escapement guide is in a retracted position said cam follower clears the glide surface and remains in the idle well, and when said escapement guide is in a extended position said cam follower strikes the glide surface causing said cam follower to slidably leave the idle well and transfer into one of the work grooves;

(d) means for radially oscillating the front guide;

(e) means for maintaining the back section in a fixed radial position;
(f) means for axially extending and retracting said escapement guide;
(g) means for selectively positioning said escapement guide, and (h) a work shaft connected on one end to said cam follower and where other end operates a machine.

6. The invention specified in claim 1, 2, or 3, wherein said work shaft is in the form of a ram for use on punch and draw presses and riveting machines.

* * * * *